United States Patent
Cravener et al.

(10) Patent No.: US 10,829,242 B2
(45) Date of Patent: Nov. 10, 2020

(54) DRIVE LINK MOUNTED FLAPPING SENSOR SYSTEMS

(71) Applicant: Textron Innovations Inc., Fort Worth, TX (US)

(72) Inventors: Kyle T. Cravener, Watauga, TX (US); Tyler Wayne Baldwin, Keller, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 247 days.

(21) Appl. No.: 15/967,007

(22) Filed: Apr. 30, 2018

(65) Prior Publication Data
US 2019/0329901 A1 Oct. 31, 2019

(51) Int. Cl.
B64D 45/00 (2006.01)
B64C 29/00 (2006.01)

(52) U.S. Cl.
CPC .......... *B64D 45/00* (2013.01); *B64C 29/0033* (2013.01); *B64D 2045/0085* (2013.01)

(58) Field of Classification Search
CPC ........................ B64D 45/00; B64D 2045/0085
See application file for complete search history.

(56) References Cited

U.S. PATENT DOCUMENTS

2014/0270610 A1 9/2014 Schofield et al.
2014/0271188 A1* 9/2014 Dillon ....................... B64F 5/60
416/1
2015/0125300 A1 5/2015 Stamps et al.
2015/0360774 A1 12/2015 Covington et al.
2017/0233094 A1* 8/2017 Lin ......................... H04L 67/12
701/29.1

FOREIGN PATENT DOCUMENTS

WO WO-2018152277 A1 * 8/2018 .......... G01M 5/0041

OTHER PUBLICATIONS

Wikipedia, The Free Encyclopedia, "Ball joint," retrieved and printed from https://en.wikipedia.org/wiki/Ball_joint [Aug. 27, 2018 11:31:12 AM], 6 pages.
Wikipedia, The Free Encyclopedia, "Universal joint," retrieved and printed from https://en.wikipedia.org/wiki/Universal_joint [Mar. 27, 2018 11:31:20 AM], 8 pages.

* cited by examiner

*Primary Examiner* — Richard G Davis
(74) *Attorney, Agent, or Firm* — Patent Capital Group

(57) ABSTRACT

A rotor system is provided in one example embodiment and may include a rotor system may be provided and may include a drive link associated with a rotor hub of the rotor system, the drive link comprising an inner member and an outer member; and a sensor system mounted to the drive link, the sensor system to accommodate motions of the drive link to track rotor hub flapping. The sensor system for the rotor system may further include a sensor, the sensor comprising a sensor arm, wherein the sensor is mounted proximate to the inner member of the drive link; and a sensor link, the sensor link comprising a first end portion moveably coupled to the sensor arm, a second end portion coupled to the outer member of the drive link, and an angled portion between the first end portion and the second end portion.

18 Claims, 12 Drawing Sheets

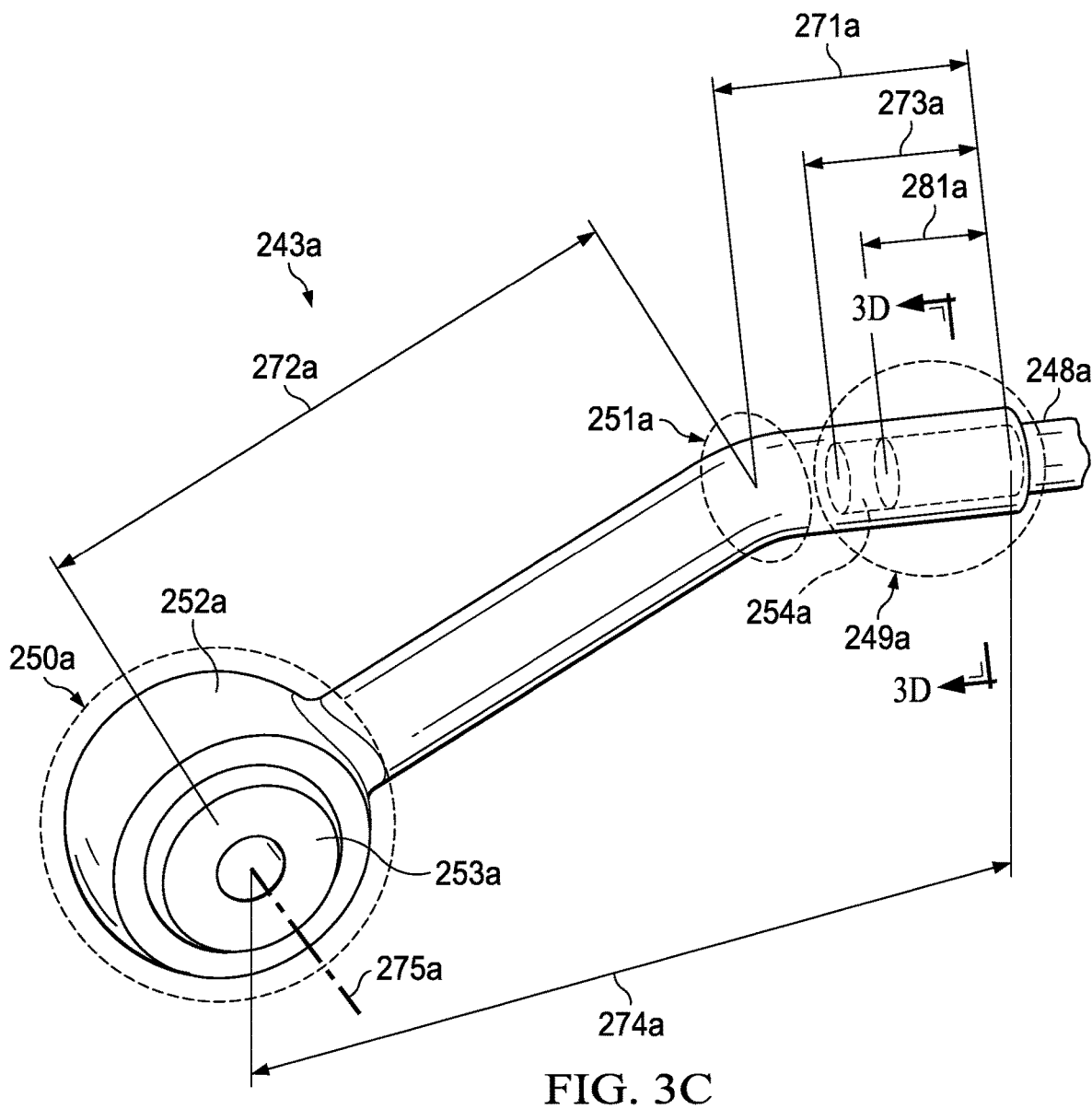
FIG. 3C
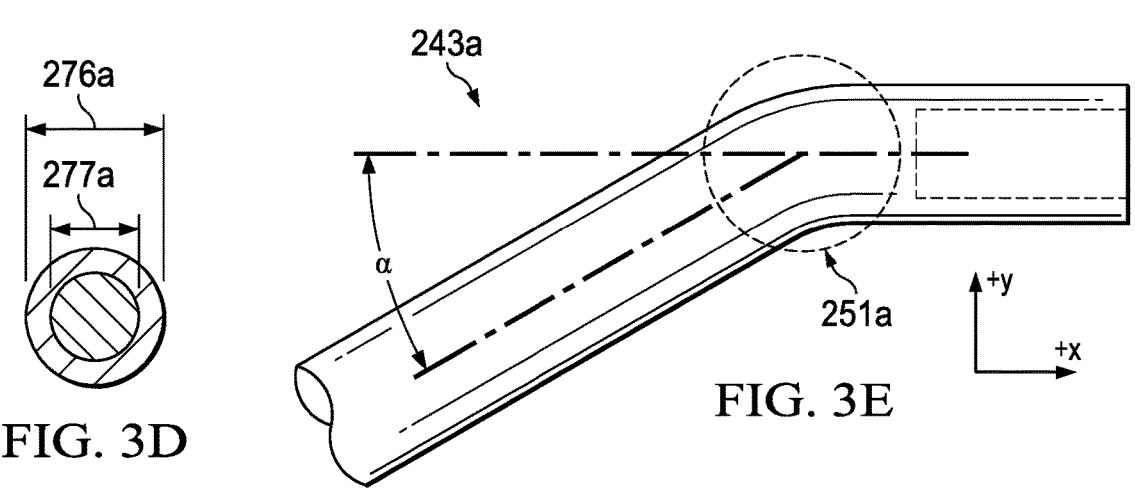
FIG. 3D
FIG. 3E

DRIVE LINK MOUNTED FLAPPING SENSOR SYSTEMS

TECHNICAL FIELD

This disclosure relates in general to the field of aircraft and, more particularly, though not exclusively, to flight rotor systems including drive link mounted flapping sensor systems.

BACKGROUND

In aircraft such as tiltrotor aircraft, rotor systems including rotor blades generate thrust to propel the aircraft. Engines for a rotor system rotate the rotor mast, which, in turn, rotates the rotor blades to generate thrust. A tiltrotor aircraft is subjected to various aerodynamic and operational forces during operation, such as lift, drag, centrifugal force, aerodynamic shears, and so forth. It is important to measure and/or determine various operational forces and motions that a tiltrotor aircraft is subjected to during operation. Systems and/or devices used to measure and/or determine various operational forces and motions can implicate numerous performance considerations and can be a challenging aspect of aircraft design.

SUMMARY

According to one aspect of the present disclosure, a rotor system may be provided and may include a drive link associated with a rotor hub of the rotor system, the drive link comprising an inner member and an outer member; and a sensor system mounted to the drive link, the sensor system to accommodate motions of the drive link to track rotor hub flapping. The sensor system for the rotor system may further include a sensor, the sensor comprising a sensor arm, wherein the sensor is mounted proximate to the inner member of the drive link; and a sensor link, the sensor link comprising a first end portion moveably coupled to the sensor arm, a second end portion coupled to the outer member of the drive link, and an angled portion between the first end portion and the second end portion to provide an angle for the sensor link. In some cases, the sensor may be a rotary variable differential transformer. The sensor may be mounted to at least one of the inner member of the drive link and/or a trunnion extending within the inner member of the drive link. The first end portion of the sensor link may include a hollow portion to receive the sensor arm. The first end portion of the sensor link can accommodate lateral movements and rotational movements of the sensor arm within the hollow portion of the first end portion of the sensor link. The second end portion of the sensor link can accommodate rotational movements for the sensor link that is coupled to the outer member of the drive link. In some instances, the sensor system may be one of a plurality of sensor systems of the rotor system.

According to another aspect of the present disclosure, a tiltrotor aircraft may be provided and may include a fuselage; and a rotor system, in which the rotor system may include: a drive link associated with a rotor hub of the rotor system, the drive link comprising an inner member and an outer member; and a sensor system mounted to the drive link, the sensor system to accommodate motions of the drive link to track rotor hub flapping. The sensor system may include a sensor, the sensor comprising a sensor arm, wherein the sensor is mounted proximate to the inner member of the drive link; and a sensor link, the sensor link comprising a first end portion moveably coupled to the sensor arm, a second end portion coupled to the outer member of the drive link, and an angled portion between the first end portion and the second end portion to provide an angle for the sensor link. The first end portion of the sensor link may accommodate lateral movements and rotational movements of the sensor arm within a hollow portion of the first end portion of the sensor link. The second end portion of the sensor link may accommodate rotational movements of the second end portion of the sensor link that is coupled to the outer member of the drive link.

According to yet another aspect of the present disclosure, a sensor system may be provided and may include a sensor, the sensor comprising a sensor arm, wherein the sensor is mounted proximate to an inner member of a torque transfer element; and a sensor link, the sensor link comprising a first end portion moveably coupled to the sensor arm, a second end portion coupled to an outer member of the torque transfer element, and an angled portion between the first end portion and the second end portion to provide an angle for the sensor link, wherein the sensor system is to measure flapping associated with a rotor hub. The first end portion of the sensor link may accommodate lateral movements and rotational movements of the sensor arm within a hollow portion of the first end portion of the sensor link and the second end portion of the sensor link may accommodate rotational movements of the second end portion of the sensor link that is coupled to the outer member of the torque transfer element.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIG. 3C is a simplified schematic diagram illustrating example details associated with the sensor link of the drive link mounted flapping sensor system of FIGS. 3A-3B, in accordance with certain embodiments.

FIG. 3D is a simplified side, cross-sectional view diagram illustrating other example details associated with the sensor link of the drive link mounted flapping sensor system of FIGS. 3A-3C, in accordance with certain embodiments.

FIG. 3E is a simplified side view diagram illustrating other example details associated with the sensor link of the drive link mounted flapping sensor system of FIGS. 3A-3D, in accordance with certain embodiments.

DETAILED DESCRIPTION

Figure 1:
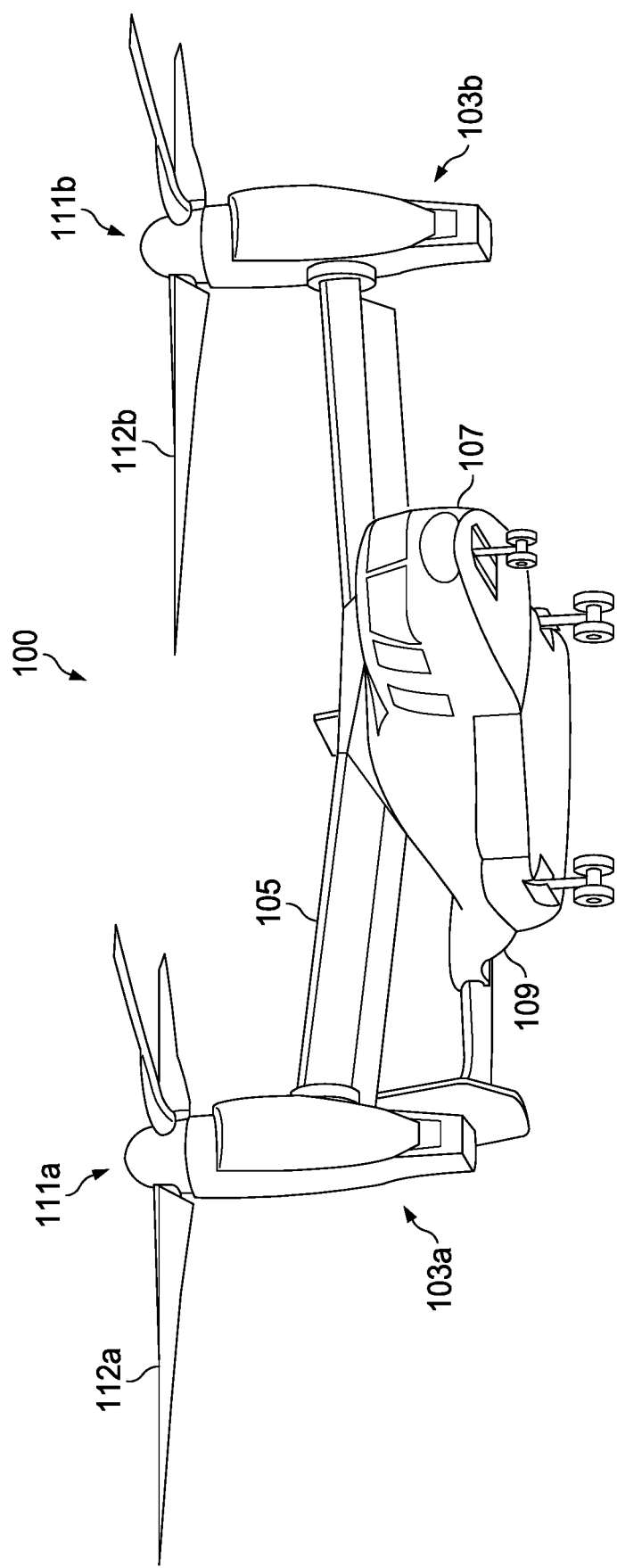
FIG. 1 is a simplified diagram of example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Referring to FIG. 1, FIG. 1 illustrates a perspective view of an example aircraft, which in this example is a tiltrotor aircraft 100. Tiltrotor aircraft 100 includes nacelles 103a and 103b, a wing 105, a fuselage 107, and a tail member 109. Nacelles 103a and 103b respectively include rotor systems 111a and 111b, and each rotor system includes a plurality of rotor blades 112a and 112b, respectively. Moreover, each nacelle 103a and 103b may include engine(s) and gearbox(es) for driving each rotor system 111a and 111b, respectively. In some embodiments, nacelles 103a and 103b may each be configured to rotate between a helicopter mode, in which the nacelles 103a and 103b are approximately vertical (as shown in FIG. 1), and an airplane mode, in which the nacelles 103a and 103b are approximately horizontal. In the illustrated embodiment, the tail member 109 may be used as a vertical stabilizer.

Aircraft such as tiltrotor aircraft 100 rely on rotor systems (e.g., rotor systems 111a and 111b) for flight capabilities, such as controlling (e.g., managing and/or adjusting) flight direction, thrust, and lift of the aircraft. Consider various examples involving tiltrotor aircraft 100 in various embodiments. For tiltrotor aircraft 100, the pitch of each rotor blade of each rotor system can be controlled using collective control or cyclic control to selectively control direction, thrust, and lift of the tiltrotor aircraft 100.

During collective control, all of the rotor blades are collectively pitched together (e.g., the pitch angle is the same for all blades), which effects overall thrust and lift. During cyclic control, the pitch angle of each of the rotor blades varies depending on where each blade is within a cycle of rotation (e.g., at some points in the rotation the pitch angle is not the same for all blades), which can effect direction of travel of the tiltrotor aircraft 100.

Aircraft such tiltrotor aircraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms 'hub/blades', 'yoke/blades', 'hub/yoke/blades', and variations thereof) to flapping, leading and lagging, and/or bending. For example, flapping is a result of the dissymmetry of lift produced by rotor blades at different positions (typically referred to as 'pitch' or 'pitch angles') during a single rotation. During rotation, for example, a rotor blade may generate more lift while advancing in the direction of travel of the rotorcraft than while retreating in the opposite direction. The rotor hub and a corresponding rotor blade may be flapped up (also sometimes referred to as being pitched 'nose-up') while advancing in the direction of travel, and may be flapped down (e.g., pitched 'nose-down') while retreating in the opposite direction. When a blade is pitched more nose-up, more lift is created on that blade, which will drag the side of the rotor/hub upward, which makes the hub/yoke flap.

Further, a rotor blade may be subjected to a leading force that causes the blade to lead forward while advancing in the direction of travel, and a lagging force that causes the blade to lag backwards while retreating. Moreover, forces exerted on rotor blades may also subject them to bending. For example, the loads resulting from flapping and lead/lag forces may cause rotor blades to bend. In some cases, for example, lift and centrifugal force acting together (e.g., as upward and outward forces) may cause rotor blades to bend upwards or 'cone'.

It is important to measure the amount of flapping experienced by the rotor system(s) of an aircraft during operation. Systems and/or devices used to measure and/or determine various operational forces and/or motions can implicate numerous performance considerations and can be a challenging aspect of tiltrotor aircraft design.

One current flapping measurement system includes sensors mounted above the rotor hub, typically to a spinner spoke that does not flap, in which a particular sensor measures flapping associated with a particular rotor blade of the rotor system. More specifically, a particular sensor in the current measurement system includes a sensor arm to which linkages are attached such that the linkages extend down from the particular sensor and attach to the upper outer portion of the hub (e.g., the upper hub plate), which flaps with the rotor system. The linkages of the particular sensor attach to the upper outer portion of the hub at a location that is proximate to the pillow block for the drive link associated with the particular blade. Thus, the current measurement system involves measuring flapping between a fixed location at which the sensor is mounted and a flapping location to which the linkages are attached. While this measurement system is useful to measure flapping, the location of the sensors and the complexity of the linkages consume space within the rotor system that could be used for other purposes and also increase weight of the rotor system.

The present disclosure describes various embodiments for measuring flapping for a rotor system by providing a flapping measurement system that includes sensor systems associated with each blade of the rotor system in which each sensor system is mounted directly to each of a drive link in the rotor system. During operation, a sensor system can track motion between members of one side of the drive link to which the sensor system is mounted in order to measure flapping associated with the rotor hub. In at least one embodiment, a sensor for a sensor system can be a rotary variable differential transformer (RVDT). A drive link can include a pair of bearings located at opposing ends (e.g., opposing sides) of the drive link. For a particular drive link, one drive link bearing can be coupled to the rotor hub via a pillow block assembly while the other drive link bearing can be coupled to a trunnion arm, which can further interface with the mast via a trunnion. In various embodiments, each bearing can be an elastomeric bearing, a metal bearing, combinations thereof, or the like. A drive link can include an outer housing member, also referred to herein as an outer member, in which each bearing can be seated. A drive link can also include a pair of inner housing members, also referred to herein as inner members, in which each inner member is associated with each bearing.

Each sensor system can include a sensor and a sensor link in which the sensor can be mounted proximate to the inner member of the drive link and coupled to the outer member of the drive link. For example, the sensor can be mounted to any combination of the inner member of the drive link and/or to the trunnion and the sensor link can be coupled on one end to the outer member of the drive link and on the other end to the sensor (e.g., via a sensor arm, discussed below). Flapping can be measured by tracking relative movement between the inner and outer members of the drive link for either side of the drive link (e.g., for either bearing). Thus, each sensor system can measure flapping between two flapping locations for a rotor system (e.g., between an inner member and the outer member of either bearing of each drive link that can flap during rotation).

The sensor and sensor link for a given sensor system can interface via the sensor arm associated with the sensor. In at least one embodiment, a first end portion of the sensor link may be hollow and may be moveably coupled around the sensor arm to accommodate lateral movements (e.g., pulling/plunging) and/or rotational movements (e.g., twisting) between the first (hollow) end portion of the sensor link and the sensor arm. For example, the sensor arm can slide in/out of the first end portion of the sensor link when the drive link experiences stretch motions during a cycle of rotation as well as twist around inside the first end of the sensor link when the drive link experiences lean motions (e.g., while flapping) during a cycle of rotation. Drive link lean is sometimes referred to as 'cocking'. A second end portion of the sensor link can be coupled to the outer housing member of the drive link via a coupling element that accommodates rotational movements between the second end portion of the sensor link and the outer member of the drive link as the drive link experiences lean motions during a cycle of rotation. In various embodiments, coupling element(s) used to couple the sensor link to the outer housing member can be a spherical bearing or a universal joint. The sensor link can further include an angled portion between the first end portion and the second end portion in which the angled portion can be fixed at a particular angle. The angled portion of the sensor link can accommodate drive link lean motions while the hub may be flapped between different pitch angles throughout a cycle of rotation.

Thus, the sensor links for each sensor system can include features that can accommodate lateral movements and/or rotational movements by the sensor links as the drive links experience stretch and/or lean motions as the hub/blades are rotated through a cycle of rotation. Such features of the sensor links can help to keep the links from binding-up and/or breaking during rotation and flapping of the hub/blades.

Embodiments described throughout this disclosure may provide numerous technical advantages including, but not limited to: providing a sensor system that mounts to each drive link of a rotor hub to measure flapping based on tracking drive link lean motions, which consumes less space and/or is lighter compared to current systems used to measure flapping; providing a sensor link for each sensor system that accommodates stretch and lean motions that a drive link may experience without binding-up and/or breaking the sensor link; and/or providing a sensor system that can be adapted to measure and/or track drive link deflections (e.g., to measure and/or track both drive link lean and stretch motions, rather than tracking/measuring drive link lean motions associated with flapping alone).

Example embodiments associated with providing a flapping measurement system including drive link mounted sensor systems are described below with more particular reference to the remaining FIGURES. It should be appreciated that tiltrotor aircraft 100 of FIG. 1 are merely illustrative of a variety of aircraft that can be used to implement embodiments of the present disclosure, such as flapping measurement system 240 discussed herein. Other aircraft implementations can include, for example, fixed wing airplanes, hybrid aircraft, unmanned aircraft, gyrocopters, a variety of helicopter configurations, and drones, among other examples. Further, a flapping measurement system including sensor systems, as discussed for various embodiments described herein, is not limited to aircraft that include drive links. For example, The FIGURES and the corresponding descriptions are applicable to any type of aircraft, which may or may not specifically include drive links as torque transfer elements, but which may include some type of torque transfer element(s) for a rotor hub of a rotor system to which sensor systems, as discussed for various embodiments described herein, can be mounted in order to track relative motion of the torque transfer element(s) during flapping in order to measure flapping associated with the rotor hub. Moreover, it should be appreciated that even though aircraft are particularly well suited to implement embodiments of the present disclosure, the described embodiments can also be implemented using non-aircraft vehicles and devices.

Figure 2A:
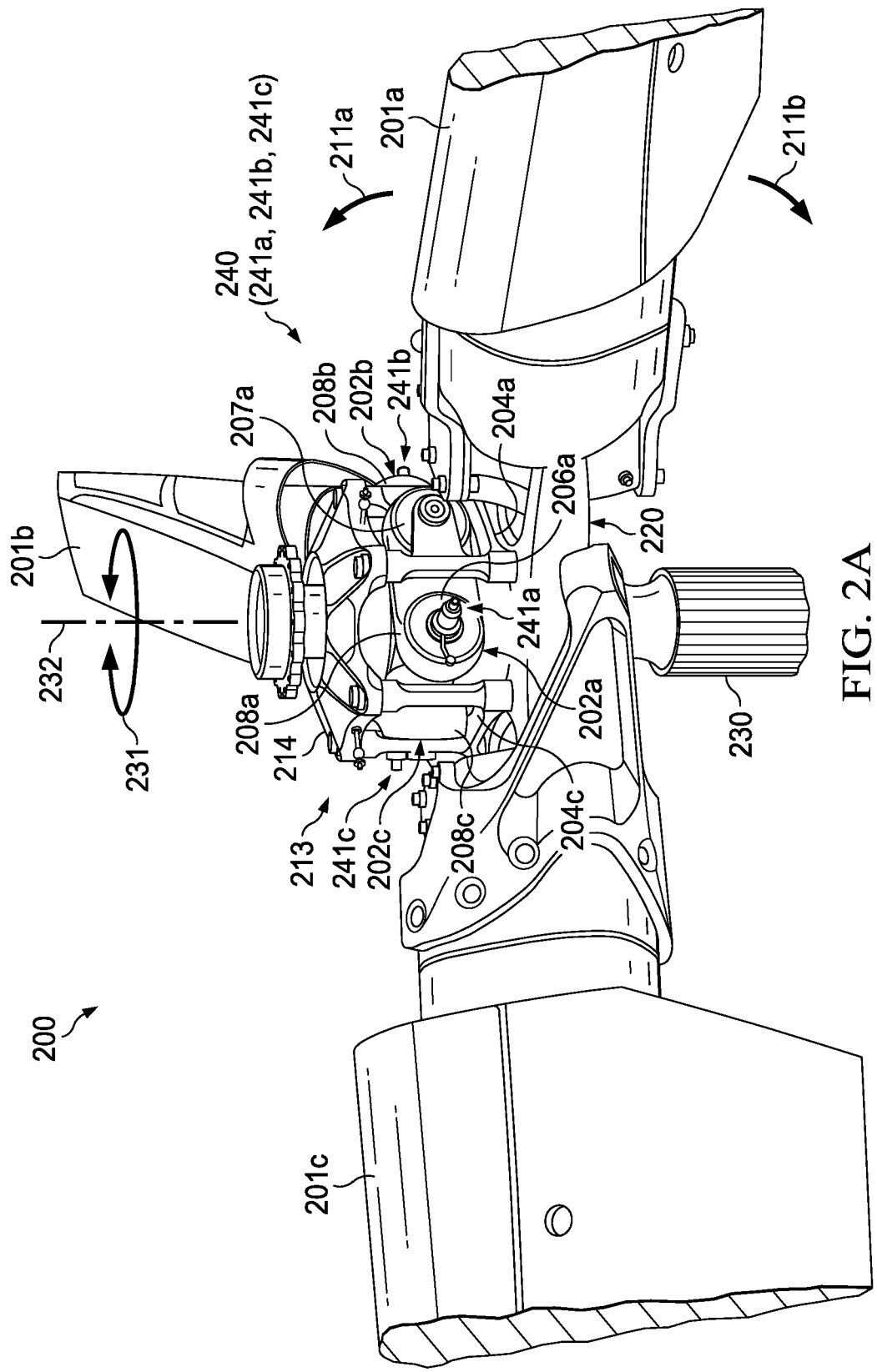
FIGS. 2A-2B are simplified schematic diagrams illustrating example details associated with drive link mounted flapping sensor systems, in accordance with certain embodiments.
Figure 2B:
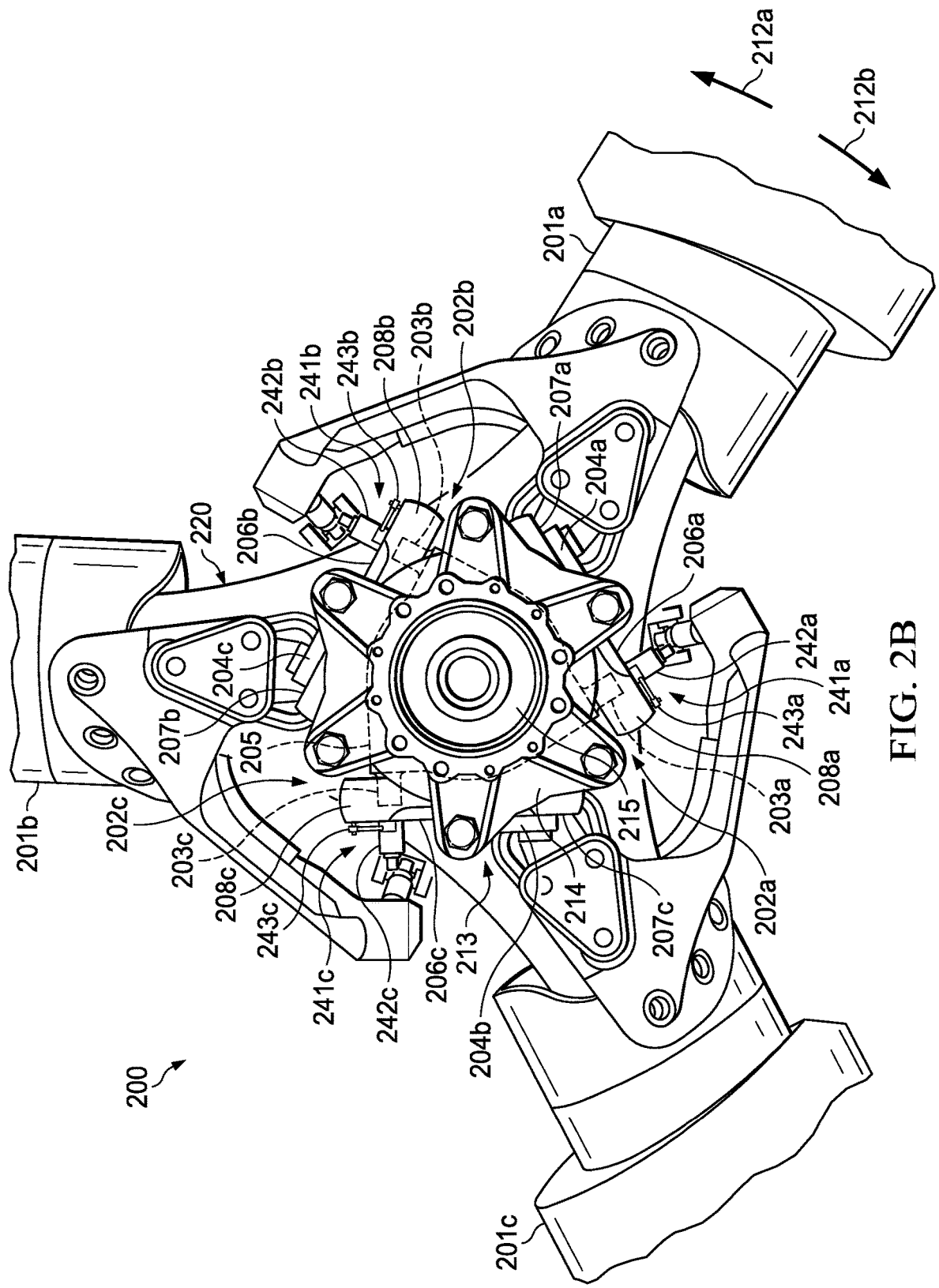

Referring to FIGS. 2A-2B, FIGS. 2A-2B are simplified schematic diagrams illustrating example details associated with a flapping measurement system 240 including, at least in part, drive link mounted flapping sensor systems 241, which can include a first drive link mounted flapping sensor system 241a, a second drive link mounted flapping sensor system 241b, and a third drive link mounted flapping sensor system 241c, in accordance with certain embodiments. In particular, FIG. 2A is a simplified isometric view diagram illustrating example details associated with a rotor system 200 that includes flapping measurement system 240 and FIG. 2B is a simplified top view diagram illustrating example details associated with the rotor system 200 that includes the flapping measurement system 240. As referred to herein in this Specification, the terms 'drive link mounted flapping sensor system', 'flapping sensor system', 'sensor system', and variations thereof can be used interchangeably. Further as referred to herein in this Specification, labels 'first', 'second', 'third', etc. may be omitted in some discussions for sake of brevity.

FIGS. 2A-2B illustrate rotor system 200 that includes a rotor hub 213 and a yoke 220. The rotor hub 213 and yoke 220 are supported by a mast 230, as shown in FIG. 2A (mast 230 is not illustrated in FIG. 2B). A number of rotor blades 201 including a first rotor blade 201a, a second rotor blade 201b, and a third rotor blade 201c can be attached to the yoke 220. In various embodiments, rotor system 200 may be representative of a given rotor system (e.g., rotor system 111a and rotor system 111b) as discussed for tiltrotor aircraft 100 illustrated in FIG. 1.

The mast 230 may be configured to transfer a rotational force and/or torque (generally indicated by arrow 231, which may be clockwise or counterclockwise) to the rotor system 200 (e.g., to the yoke 220) about a rotational axis 232 (collinear with the center of the mast 230); thereby causing the rotor blades 201a-201c to rotate about the rotational axis 232. The rotational force and/or torque 231 may be supplied by engine(s) during operation.

The rotor hub 213 may include an upper portion having an upper plate 214 and an upper spring assembly 215. The rotor hub 213 may also include a lower portion including a lower plate (not shown) coupled to the yoke 220 and a lower spring assembly (not shown). The upper spring assembly 215 and lower spring assembly can include, at least in part, elastomeric layers (e.g., rubber layers) that are collectively configured to react to operational loads (e.g., thrust loads, shear and moment loads, etc.) through deflection of the elastomeric layers.

Rotational force and/or torque 231 is transferred from the rotor mast 230 to the yoke 220 via respective drive links 202 (including a first drive link 202a, a second drive link 202b, and a third drive link 202c, respectively) that provide a torque path from a trunnion 205 via trunnion arms 203 (including a first trunnion arm 203a, a second trunnion arm 203b, and a third trunnion arm 203c, respectively) to pillow blocks 204 (including a first pillow block 204a, a second pillow block 204b, and a third pillow block 204c, respectively) attached to the yoke 220. Each respective trunnion arm 203a-203c represents an arm of trunnion 205, which interfaces with the mast 230 (e.g., via a splined portion (not shown) of the trunnion that interfaces with the mast 230). As referred to herein in this Specification, a 'drive link' (e.g., drive links 202) may generally be referred to as a 'torque transfer element'.

Each respective drive link 202a-202c can be disposed radially and equally spaced about yoke 220. Each respective drive link 202a-202c can include a respective pair of bearings (e.g., elastomeric, metal, etc.) including a first bearing 206 (206a-206c, respectively) and a second bearing 207 (207a-207c, respectively) seated within a outer housing member 208 (208a-208c, respectively) of each respective drive link 202a-202c. Elastomeric bearings are illustrated for embodiments described herein; however, this is not meant to limit the broad scope of the present disclosure. Each first bearing 206 of each drive link 202 can be coupled to each trunnion arm 203 via a first inner housing member of the drive link 202 and each second bearing 207 can be coupled to each pillow block 204 via a second inner housing member of the drive link 202.

In various embodiments, drive links 202a-202c are configured to accommodate lean articulations and/or movements (collectively referred to herein as 'motions') for rotor hub 213, yoke 220, and the attached rotor blades 201a-201c to flap in/out (e.g., to flap up/down) of the plane of the yoke 220, such as in flapping directions 211a and 211b, as shown in FIG. 2A. In various embodiments, drive links 202a-202c are also configured to accommodate stretch motions as the rotor blades 201a-201c rotate (e.g., as generally indicated by arrows 212a and 212b, as shown in FIG. 2B) during a cycle of rotation about rotational axis 232 for changes in torque (e.g., increasing/decreasing torque) applied to the rotor blades 201a-201c and/or leading and/or lagging forces (also illustrated generally by arrows 212a and 212b) that may be experienced by the rotor blades 201a-201c.

Each sensor system 241 can include a sensor 242 and a sensor link 243. For example, a first sensor system 241a can include a first sensor 242a and a first sensor link 243a, a second sensor system 241b can include a second sensor 242b and a second sensor link 243b, and a third sensor system 241c can include a third sensor 242c and a third sensor link 243c. Each sensor link 243 can have a first end portion, a second end portion, and an angled portion between the first and second end portions.

Each sensor 242 (242a-242c, respectively) can include a sensor housing 244 (244a-244c, respectively) and a sensor arm 248 (248a-248c, respective), which is connected to a puck and a shaft for each sensor, discussed below. In at least one embodiment, each sensor 242 can be an RVDT sensor. In various embodiments, each respective sensor system 241a-241c in the flapping measurement system 240 can be part of in an aircraft control system of an aircraft in which the respective sensors 242a-242c can be electrically connected to flight control system(s), computing device(s), processor(s), combinations thereof, or the like in order to communicate electrical signals and/or information between respective sensors 242a-242c and the system(s), processor(s), etc. In various embodiments, the electrical signals and/or information can include motion measurements associated with respective drive links 202a-202c as determined by respective sensors 242a-242c. The motion measurements can be used to determine an amount of flapping and flapping direction (e.g., up or down) experienced by the rotor hub 213 during rotation about rotational axis 232. It is to be understood that motion measurements tracked by each respective sensor 242a-242c for each respective sensor system 241a-241c may be used to determine an amount of flapping and flapping direction using any combination of mathematical algorithms, models, software, hardware, etc. as would be would be appreciated by one of ordinary skill in the art.

In at least one embodiment for a given sensor system 241 including a given sensor 242 and a given sensor link 243 associated with a given drive link 202, the sensor housing for the sensor 242 can be mounted to the first inner housing member 209 of the given drive link 202 and/or mounted to the trunnion arm 203 coupled to the first inner housing member 209 of the given drive link 202. For the given sensor system 241, the first end portion of the sensor link 243 can be moveably coupled to the sensor arm of the sensor 242 to accommodate stretch and/or lean motions experienced by the given drive link 202 during a cycle of rotation of the given drive link 202 about rotational axis 232. For example, in at least one embodiment, the first end portion of the given sensor link 243 may be hollow to moveably receive the sensor arm of the given sensor 242. The second end portion of the given sensor link 243 can be coupled to the outer housing member 208 of the given drive link 202. For example in at least one embodiment, the second end portion of the given sensor link 243 may include a coupling element that may accommodate rotational movements by the given sensor link 243 in which the coupling element is attached to an attachment point of the outer housing member 208 of the given drive link 202. As the given drive link 202 leans during flapping, the given sensor system 242, via the given sensor 242 and sensor link 243, can track drive link 202 lean motions to measure flapping (e.g., amount and/or direction) for the hub 213 relative to the given drive link 202 during a cycle of rotation.

Figure 3A:
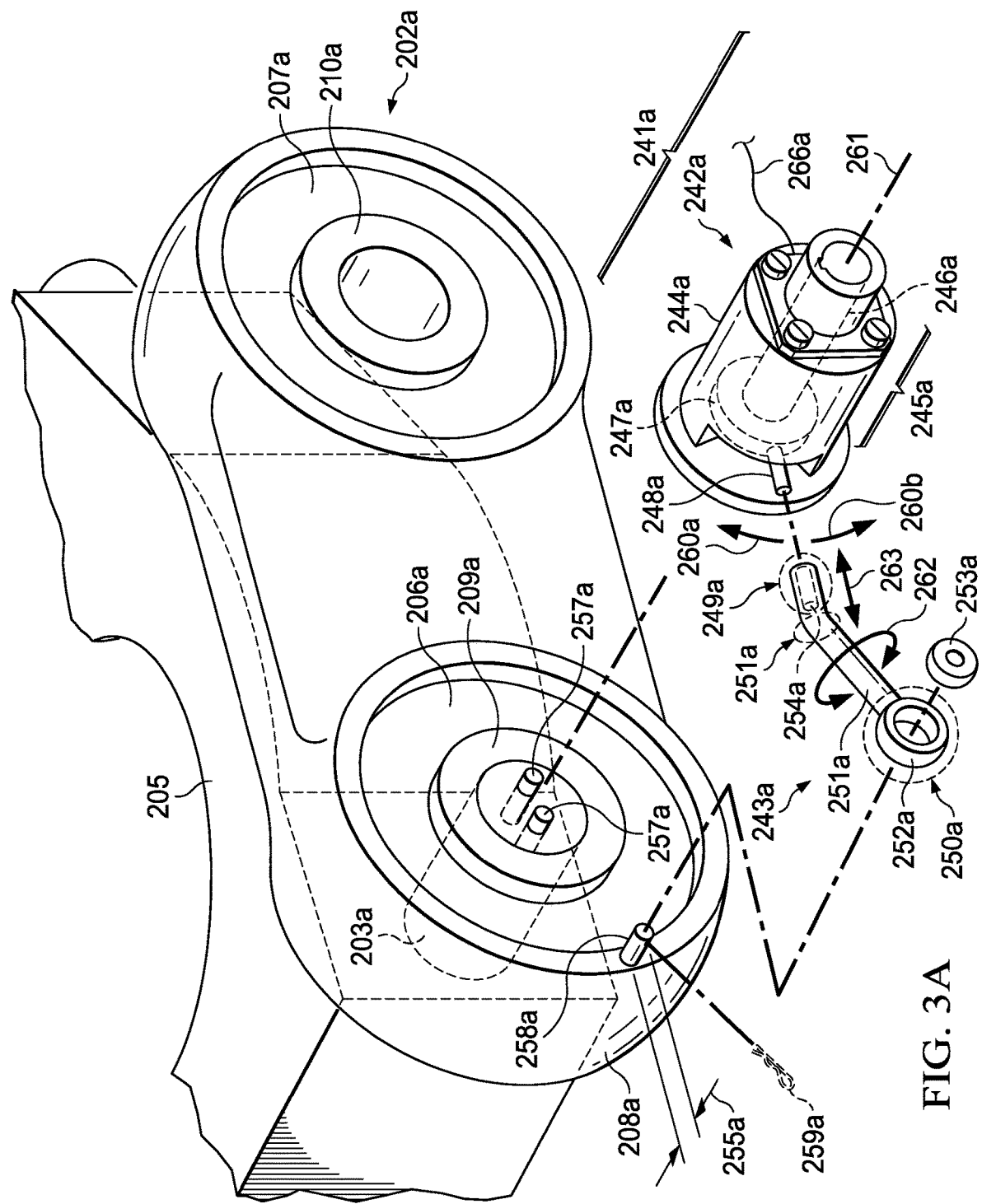
FIG. 3A is a simplified exploded view diagram illustrating example details associated with a drive link mounted flapping sensor system, in accordance with certain embodiments.
Figure 3B:
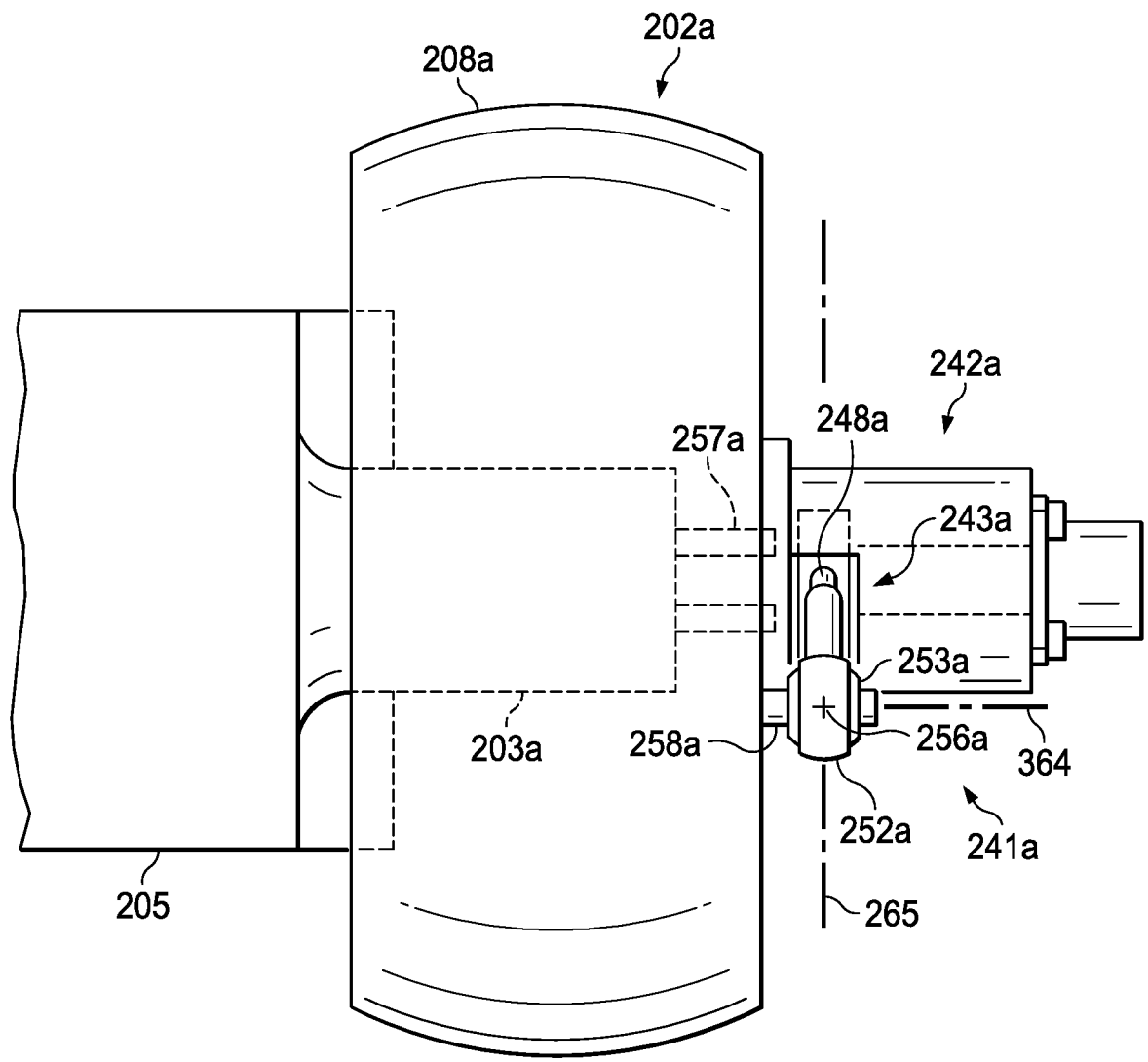
FIG. 3B is a simplified side view diagram illustrating other example details associated with the drive link mounted flapping sensor system of FIG. 3A, in accordance with certain embodiments.

FIGS. 3A-3E, 4A-4B, and 5A-5B illustrate various example details that can be associated with a drive link mounted flapping sensor system. In particular, FIG. 3A is a simplified exploded view diagram illustrating example details that can be associated with drive link mounted flapping sensor system 241a, in accordance with certain embodiments. FIG. 3A includes drive link 202a, drive link mounted flapping sensor system 241a, a portion of trunnion 205, and trunnion arm 203a. Pillow block 204a and other elements of the rotor system are not illustrated for the embodiment of FIG. 3A for sake of brevity. FIG. 3B is a simplified side view diagram illustrating other example details that can be associated with drive link mounted flapping sensor system 241a, in accordance with certain embodiments. FIG. 3C is a simplified schematic diagram illustrating example details that can be associated with sensor link 243a of drive link mounted flapping sensor system 241a, in accordance with certain embodiments. FIG. 3D is a simplified cross-sectional view diagram illustrating example details that can be associated with sensor link 243a, in accordance with certain embodiments. The cross-section of FIG. 3D is cut along a line as generally indicated by the lines labeled '3D' in FIG. 3C. FIG. 3E is a simplified side view diagram illustrating other example details that can be associated with sensor link 243, in accordance with certain embodiments.

Although only one drive link mounted flapping sensor system 241a is discussed for the embodiments of FIGS. 3A-3E, 4A-4B, and 5A-5B it is to be understood that various example details, features, etc. that may be associated with drive link mounted flapping sensor system 241a can also be associated with any other drive link mounted flapping sensor systems, including drive link mounted flapping sensor systems 241b and 241c, in accordance with embodiments of the present disclosure. Further, various example details, features, etc. that may be associated with drive link 202a and/or trunnion arm 203a can also be associated with any other drive links (e.g., drive links 202b and 202c) and/or trunnion arms (e.g., trunnion arms 203b and 203c) for a rotor system (e.g., rotor system 200).

Referring to FIG. 3A, drive link mounted flapping sensor system 241a can include sensor 242a and sensor link 243a. Drive link 202a can include outer housing member 208a, a first bearing 206a, a first inner housing member 209a, a second bearing 207a, and a second inner housing member 210a. First inner housing member 209a can be suitably sized to receive trunnion arm 203a. In some embodiments, first inner housing member 209a can include a closed end in which the trunnion arm 203a can be seated; however, in other embodiments, first inner housing member 209a can be a hollow race in which the trunnion arm 203a can be seated. For the embodiment of FIG. 3A, first inner housing member 209a includes a closed end in which trunnion arm 203a is seated. Second inner housing member 210a can be hollow and suitably sized to be secured to pillow block 204a.

The drive link 202a can further include one or more first sensor system mounting element(s) 257a and a second sensor system mounting element 258b that can be used to mount the flapping sensor system 241a to one side of drive link 202a. For example, the first sensor system mounting element(s) 257a can be used to mount the sensor 242a to any combination of the first inner member 209a of the drive link 202a and/or to the trunnion arm 203a for one side of the drive link 202a and the second sensor system mounting element 258a can be used to secure the sensor link 243a to the outer housing member 208a of the drive link 202a. Although example embodiments discussed herein with regard to the mounting sensor system 241a are described with respect to mounting the sensor system on the side of drive link 202a associated with first bearing 206a, it is to be understood that sensor systems described herein may be mounted on either side of a drive link depending on different application(s) and/or implementation(s) in accordance with various embodiments of the present disclosure.

The first sensor mounting element(s) 257a can be attached to or integral with any combination of the first inner housing member 209a and/or the trunnion arm 203a depending on the design, application, and/or implementation of the drive link 202a and/or the trunnion arm 203a, in accordance with various embodiments. In some embodiments, one or more first sensor mounting element(s) 258a can be stud(s) that may be threaded on one end and the covered end of first inner housing member 209a and/or trunnion arm 203a can include female threading to receive the first sensor system mounting element(s) 257a. In still some embodiments, the first inner housing member 209a and/or trunnion arm 203a can be fabricated, machined, cast, etc. to include first sensor system mounting element(s) 257a. In various embodiments, first sensor mounting element(s) can include stud(s), bolt(s), and/or clip(s) for mounting the flapping sensor system to the drive link; however, other means or mechanisms for attaching or integrating sensor system mounting element(s) to drive links and/or trunnion arms can be envisioned and, thus, are clearly within the scope of the present disclosure.

In some embodiments, second sensor system mounting element 258a can be threaded on one end and drive link outer housing member 208a can include female threading to receive the second sensor system mounting element 258a. In still some embodiments, drive link outer housing member 208a can be fabricated, machined, cast, etc. to include second sensor system mounting element 258a integrated into the outer housing member 208a. Other means or mechanisms for attaching or integrating a second sensor mounting element to drive links can be envisioned and, thus, are clearly within the scope of the present disclosure.

Sensor 242a can include a sensor housing 244a and a sensor shaft assembly 245a. Sensor shaft assembly 245a can include a shaft 246a that is connected to a puck 247a, which includes a sensor arm 248a. Sensor 242a can be electrically connected to various flight control systems, etc. via one or more communication link(s) 266a (e.g., wire(s), bus(es), etc.). The sensor housing 244a can include various electronic components (e.g., coils, magnets, etc.) to facilitate measurement operations by the sensor 242a during operation. In various embodiments, sensor 243a (and any other drive link mounted flapping sensors discussed herein) can be an RVDT or any other similar positional sensor that can measure changes in position of the shaft 246a as the sensor arm 248a rotates (as generally illustrated by arrow 260a and arrow 260b) about an axis 261 that is collinear with the shaft 246a (e.g., to track drive link 202a flapping motions). Sensor 242a can be mounted to the first inner housing member 209a and/or trunnion arm 203a (e.g., depending on where the first mounting element(s) 257a are received).

Sensor link 243a can include a first end portion 249a, a second end portion 250a, and an angled portion 251a that can be located between the first end portion 249a and the second end portion 250a of the sensor link 243a. As discussed herein, various features of the sensor link 243a can accommodate rotational movements (as generally illustrated by arrow 262) that may occur during flapping (e.g., drive link 202a lean motions) to allow sensor link 243a to rotate around sensor arm 248a and/or to rotate in relation to the outer housing member 208a and can accommodate lateral movements (as generally illustrated by arrow 263) that may occur during torque changes (e.g., stretch motions) and/or flapping to allow the sensor arm 248a to slide in/out of the first end portion 249a of the sensor link 243a.

For example, the first end portion 249a of the sensor link 243a can have an inner diameter that provides a hollowed portion 254a to moveably couple the sensor link 243a to the sensor arm 248a. The hollowed portion 254a allows the sensor link 243a to rotate in relation to the sensor arm 248a and/or allows the sensor arm 248a to slide in/out of the first end portion 249a of the sensor link 243a.

In at least one embodiment, the second end portion 250a of the sensor link 243a can include a bearing housing 252a in which a bearing 253a can be seated to allow the sensor link 243a to rotate in relation to the outer housing member 208a of the drive link 202a. In at least one embodiment, bearing housing 252a and bearing 253a can be a ball joint type bearing assembly in which bearing 253a can have spherical features and can be seated in bearing housing 252a having socket features to secure the bearing 253a in the housing 252a. Bearing 253a can have an inner diameter that can be suitably sized to accommodate coupling the bearing 253a to the second sensor system mounting element 258a to secure the second end portion 250a of the sensor link 243a to the outer member 208a of the drive link 202a. In some embodiments, second sensor system mounting element 257a can include a securing feature (e.g., slot(s), hole(s), groove(s), etc.) to which a securing mechanism 259a (e.g., cotter pin(s), cotter key(s), circle cotter(s), retaining clip(s), etc.) can be mated in order to secure the bearing 253a and, in turn, the second end portion 250a of the sensor link 243a to the outer housing member 208a of the drive link 202a. In some embodiments, multiple securing features and mechanisms can be used to secure the second end portion 250a to the outer housing. Second sensor system mounting element 358a can have a length 255a that the element extends out from the outer housing member 208a. The length 255a of the second sensor system mounting element 258a can be sufficient to receive and secure the bearing 253a. In some embodiments, the length 255a that the mounting element 258a can extend from the outer housing member can range between 0.5 inches and 3 inches; however, other lengths can be envisioned depending on application(s) and/or implementation(s) (e.g., for different drive link/bearing sizes, different coupling elements, etc.) in accordance with various embodiments of the present disclosure.

Although sensor links illustrated for various embodiments described herein include bearings as the coupling elements for coupling the sensor links to outer drive link members, other types of coupling elements can be envisioned. For example, in some embodiments, a coupling element may be a universal joint configured for the second end portion of a sensor link that may attach to the outer member of the drive link.

During operation, the angled portion 251a of the sensor link 243a can force the sensor link 243a to rotate relative to sensor arm 248a when drive link 202a leans as changes between different flapping angles may occur throughout a cycle of rotation of the hub 213/blades 201 about the rotational axis 232. If the sensor link 243a were not angled and/or could not accommodate changing flapping angles throughout a cycle of rotation, it could bind-up, bend, and/or break during operation. The angled portion 251a has a fixed angle, as discussed in further detail herein.

In various embodiments, sensor link 243a can be made of metal(s), metal alloy(s), composite material(s) (e.g., carbon fiber reinforced polymer (CFRP)), plastic(s), reinforced plastic(s), fiberglass(es), reinforced fiberglass(es), combinations thereof, or the like. In various embodiments, bearing 353a can be made of an elastomeric material (e.g., rubber), metal, metal alloy, composite, combinations thereof, or the like. Additional features related to the sensor link 243a are discussed below with reference to FIGS. 3B-3E.

Referring to FIG. 3B, FIG. 3B is a simplified side view diagram illustrating example details that can be associated with mounting sensor system 241a to drive link 202a. In particular, FIG. 3B illustrates a nominal position of the sensor link 243a in relation to the sensor arm 248a of the sensor 242a when the sensor system 241a is mounted to drive link 202a. For the embodiment of FIG. 3B, the rotor system 200 is not in a flapped position. In at least one embodiment, when the rotor system 200 is not in a flapped position, a horizontal center (represented by crosshair 256a) of the bearing 253a and housing 252a (as determined relative to a horizontal axis 264 in which the bearing 253a and housing 252a are situated on the second sensor system mounting element 258a) may be in nominal alignment with a radial center (not labeled) of the sensor arm 248a (based on the diameter of the sensor arm 248a) along a vertical plane 265 that intersects the horizontal center 256a of the bearing 253a and housing 252a and the radial center of the sensor arm 248a such that the angle between the vertical plane 265 and the horizontal axis 264 is approximately 90 degrees.

When the rotor system 200 is in a flapped position (up or down), the horizontal center 256a of the bearing and housing 252a can move out of alignment with the radial center of the sensor arm 248a as the sensor link 243a can rotate with respect to the sensor arm 248a and/or the outer housing member 208a of the drive link 202a. Various sensor link movements during changes in torque and/or flapping are discussed in more detail below with regard to FIGS. 4A-4B and 5A-5B.

Referring to FIGS. 3C-3E, FIGS. 3C-3E illustrates other example details that can be associated with sensor link 243a, in accordance with certain embodiments. As discussed, sensor link 243a can include first end portion 249a, second end portion 250a, and angled portion 251a. The angled portion 251a can have an angle alpha 'α' (FIG. 3E) that is a fixed angle. In various embodiments, a sensor link (e.g., sensor link 243a) may be suitably sized based on various considerations including, but not limited to: the size of the drive link to which the sensor link is mounted; the amount of deflection that is expected, measured, or otherwise determined for the drive link; weight of the sensor link; operating conditions (e.g., amount of rotational movement to be accommodated by the sensor link, environmental conditions, etc.); combinations thereof; or any other considerations that may be relevant to and/or impact operation of the sensor link to track drive link lean motions in order to determine flapping for a rotor hub.

For example, sensor link 243a may include a first length 271a as measured between the end of the first end portion 249a (that includes the hollow portion 254a) and the vertex of angle 270a, a second length 272a as measured between a radial center 275a of the second end portion 250a (e.g., based on the diameter of the housing 252a/bearing 253a) and the vertex of angle 370a, an overall length 274a as measured between the radial center 275a of the second end portion 250a and the end of the first end portion 249a, and a length 273a of the hollow portion 254a.

In at least one embodiment, the overall length 274a of the sensor link 243a may be suitably sized such that the sensor link 243a spans the gap between the inner housing member 209a and the outer housing member 208a for a given angle α of the angled portion 251a of the sensor link 243a. For example, the overall length 274a can be based on a distance between an engagement length 281a of the sensor arm 248a that is to be received within the hollow portion 254a of the first end portion 249a of the sensor link 243a and the second mounting element 258a of the outer member 208a of the drive link 202a that is coupled to the coupling element (e.g., bearing 253a) for the second end portion 250a of the sensor link 243a for a given angle α of the angled portion. In at least one embodiment, the first length 271a may be approximately 0.5 inches, the second length 272a may be approximately 1.25 inches, the length 273a of the hollow portion 254a may be approximately 0.5 inches and the angle α may be approximately 10 degrees; however, other lengths, angles, dimensions, etc. can be envisioned depending on various application(s), implementation(s), drive link/bearing sizes/types/etc., determined drive link deflections, weight, operational wear rate, combinations thereof, or the like in accordance with various embodiments of the present disclosure.

For example, the length 273a of the hollow portion 254a and the engagement length 281a of the sensor arm 248a can be varied based on the amount of plunging in/pulling out of the hollow portion 254a that may be expected by the sensor arm 248a for axial deflections (e.g., outward and inward stretch motions) determined (e.g., calculated, expected, tested, etc.) for the drive link 202a under positive torque conditions (e.g., outward stretch experienced during acceleration of the rotor blades, which causes the sensor arm to push or plunge into the hollow portion of the sensor link) and negative torque conditions (e.g., inward stretch, sometimes referred to as 'squish', experienced during deceleration of the rotor blades, which causes the sensor arm to pull out of the hollow portion of the sensor link).

Consider one non-limiting example, in which the nominal engagement length 281a of the sensor arm 248a may be 0.2 inches within the hollow portion 254a under conditions of no torque (e.g., the blades are at rest) and the length 273a of the hollow portion may be 0.6 inches. For this example, if the drive link 202a first bearing 206a may be expected to stretch (outward) 0.3 inches radially under maximum positive torque, then the 0.6 inch length 273a of the hollow portion 254a may allow 0.3 inches of additional engagement length 281a for the sensor arm 248a to push inward into the hollow portion 254a for a total of 0.5 inches of engagement length 281a of the sensor arm 248a with 0.1 inches of buffer space between the closed end of the hollow portion 254a and the end of the sensor arm 248a that is received in the hollow portion. Further for this example, if the drive link 202a first bearing 206a may be expected to stretch (inward) 0.1 inches radially under maximum negative torque, then the 0.6 inch length 273a of the hollow portion 254a may allow 0.1 inches of engagement length 281a for the sensor arm to pull outward from the hollow portion 254a of the sensor arm while still remaining within the hollow portion 254a (e.g., 0.2 inches of nominal engagement minus 0.1 inches of inward stretch equals 0.1 inches of engagement under maximum negative torque).

Referring to FIG. 3D, the first end portion 249a of the sensor link 243a can have an outer diameter 276a and an inner diameter 277a. The inner diameter 277a provides the hollow portion 254a for the sensor link 243a. In some embodiments, the outer diameter 276a of the first end portion 249a may be the outer diameter of the sensor link 243a between the end of the first end portion 249a and the second end portion 250a (e.g., up to and/or including the housing 252a); however, in other embodiments, the diameter between the end of the first end portion 249a and the second end portion 250a may be varied (e.g., tapered). In at least one embodiment, the outer diameter 276a may be approximately 0.25 inches and the inner diameter 277a may be approximately 0.160 inches; however, other diameters may be envisioned depending on application(s) and/or implementation(s) (e.g., different sensor arm diameters, different operating conditions, different sensor arm and/or sensor link materials, etc.) in accordance with various embodiments of the present disclosure.

Referring to FIG. 3E, the angle α for the angled portion 251a may be fixed at an angle for an X-Y coordinate system in which the X-axis is situated parallel with the first end portion 249a of the sensor link 243a. In various embodiments, the angle α may range between 2 degrees and greater than 90 degrees, and may be varied based on several considerations. For example, if α is larger, then there may be less twist in the hollow portion between the sensor arm and the sensor link when the rotor hub is flapped (e.g., the drive link is leaned); however, a larger α may result in a larger and potentially heavier/costlier/etc. sensor link in comparison to a sensor link having a smaller α. Although a smaller α may result in a smaller sensor link, which may be better for packaging, and may weigh less in comparison to a sensor link having a larger α, a smaller α for a sensor link may result in more twisting movement in the hollow portion between the sensor arm and the sensor link when the rotor hub is flapped, which may increase the wear rate of the sensor link (e.g., within the hollow portion of the sensor link and/or for the coupling between the sensor link and the outer member of the drive link) and/or for the sensor arm. Accordingly, different α angles may be provided for a sensor link depending on different application(s) and/or implementation(s) based on various design considerations, etc. in accordance with various embodiments of the present disclosure.

Figure 4A:
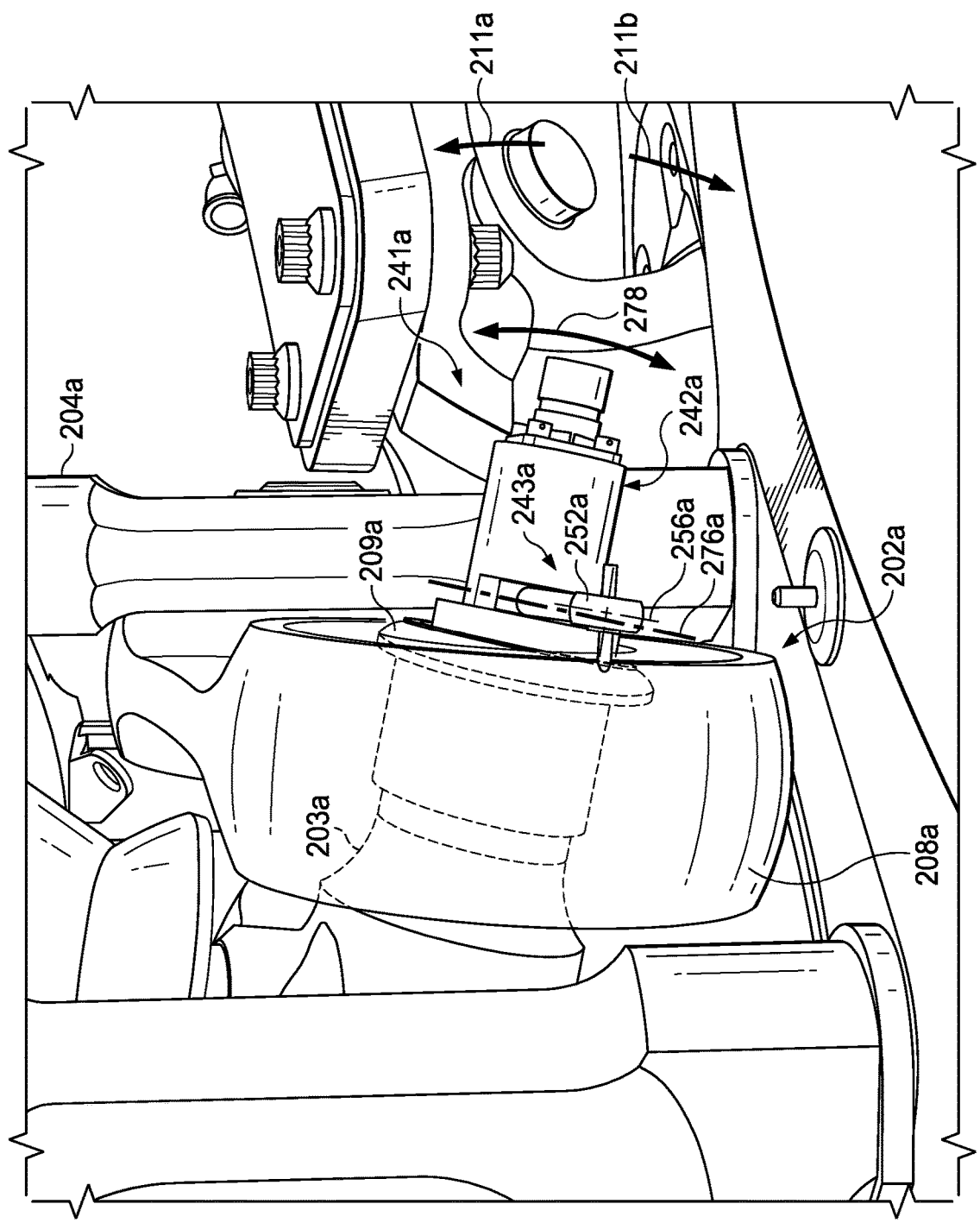
FIGS. 4A-4B are simplified diagrams illustrating other example details associated with a drive link mounted flapping sensor, in accordance with certain embodiments.
Figure 4B:
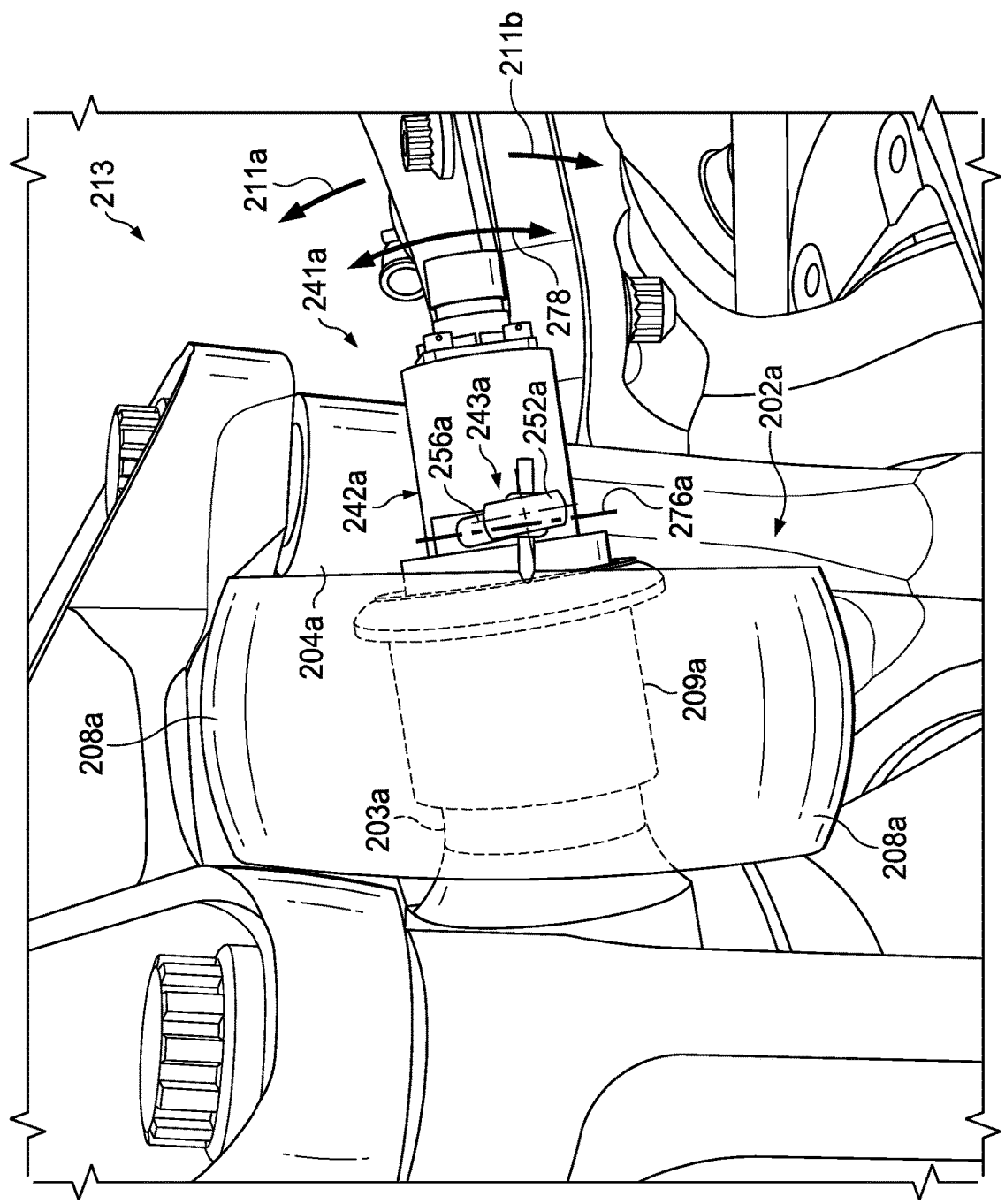

Referring to FIGS. 4A-4B, FIGS. 4A-4B are simplified isometric view diagrams illustrating example details associated with the drive link mounted flapping sensor system 241a, in accordance with certain embodiments. In particular, FIGS. 4A-4B illustrate example drive link 202a lean motions that the sensor link 243a can accommodate during flapping. Flapping directions 211a and 211b are included in FIGS. 4A-4B for reference.

FIG. 4A illustrates an example when the rotor hub 213 is flapped down (as generally indicated by flapping direction 211b) for a particular rotor blade (e.g., rotor blade 201a, not shown in FIG. 4A) within a cycle of rotation. During such flapping, the drive link 202a can accommodate out of plane movements (e.g., via its bearings) due to drive link twist or lean motions (as generally illustrated by arrows 278) between the outer housing member 208a and the inner housing member 209a coupled to trunnion arm 203a. In various embodiments, the total lean that that a drive link may accommodate may be approximately half of the total flapping angle that may be supported by a rotor system. For example, if a rotor system supports 15 degrees of flapping, the total lean that drive links for the rotor system can accommodate may be approximately 7.5 degrees.

The sensor arm 248a is not shown in FIG. 4A, however, a radial center of the sensor arm is represented by dashed line 276a. The horizontal center of the sensor link 243a housing 252a is represented by crosshair 256a. As illustrated in FIG. 4A, when the rotor hub 213 is flapped down, the radial center of the sensor arm as represented by dashed line 276a can be out of alignment with the horizontal center of the sensor link 243a housing 252a/bearing 253a (crosshair 256a) as the sensor link 243a is allowed to rotate relative to the sensor arm (e.g., via the hollow portion 254a) and relative to the outer housing member 208a of the drive link 202a (e.g., via the ball jointed second end portion 250a).

FIG. 4B illustrates an example when the rotor hub 213 is flapped up (as generally indicated by flapping direction 211a) for the particular rotor blade. Again, the drive link 202a can accommodate out of plane movements (e.g., via its bearings) due to drive link twist or lean motions (as generally illustrated by arrows 278) between the outer housing member 208a and the inner housing member 209a coupled to trunnion arm 203a. As illustrated in FIG. 4B, when the rotor hub 213 is flapped up, the radial center of the sensor arm (dashed line 276a) can again be out of alignment with the horizontal center (crosshair 256a) of the sensor link 243a housing 252a as the sensor link 243a is allowed to rotate relative to the sensor arm (e.g., via the hollow portion 254a) and relative to the outer housing member 208a of the drive link 202a (e.g., via the ball jointed second end portion 250a). Further, the angled portion 251a of the sensor link 243a accommodates changes between flapping angles as the rotor hub 213 may be flapped between up and down directions (211a, 211b, respectively) throughout a cycle of rotation by forcing the sensor link 243a to rotate around the sensor arm 248a.

Figure 5A:
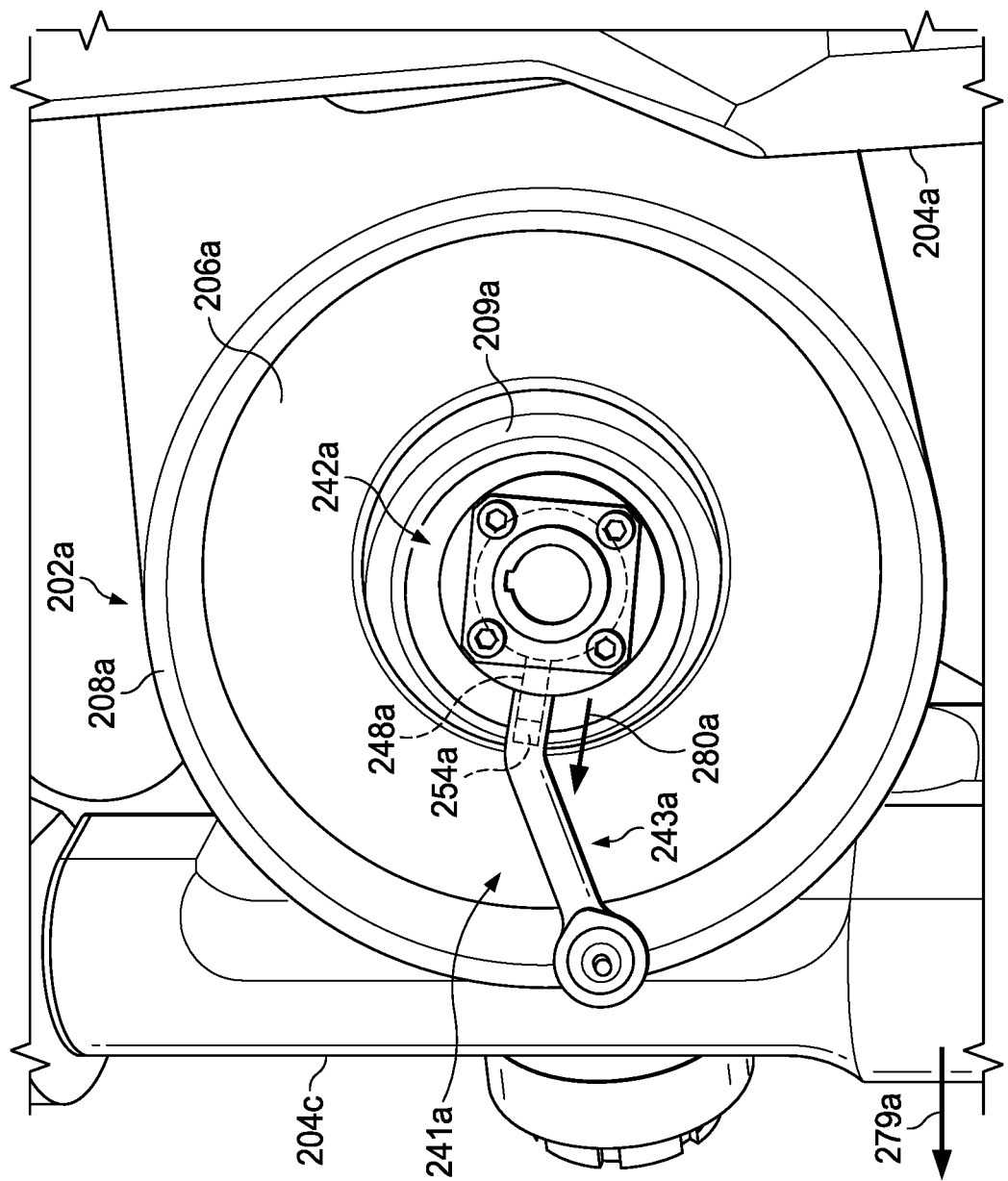
FIGS. 5A-5B are simplified diagrams illustrating yet other example details associated with a drive link mounted flapping sensor, in accordance with certain embodiments.
Figure 5B:
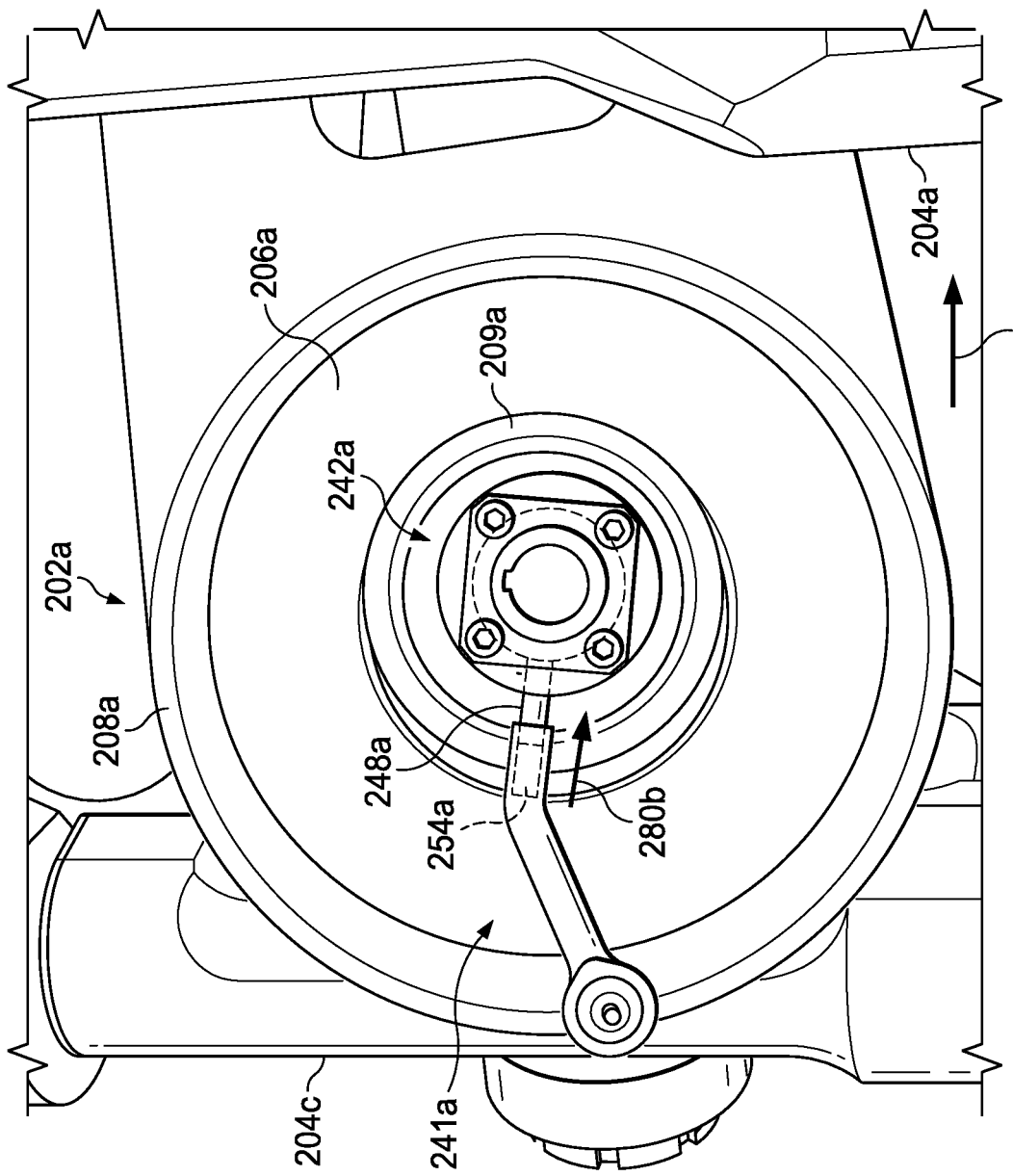

Referring to FIGS. 5A-5B, FIGS. 5A-5B are simplified isometric view diagrams illustrating example details associated with the drive link mounted flapping sensor system 241a, in accordance with certain embodiments. In particular, FIGS. 5A-5B illustrate example stretch motions (as generally illustrated by motions 279a in FIG. 5A and 279b in FIG. 5B) that the sensor link 243a can accommodate during changes in torque. It is to be understood that the stretch motions illustrated in FIGS. 5A-5B are amplified in order to illustrate features of the drive link mounted sensor system 241a.

FIG. 5A illustrates an example when the rotor system 200 is under positive torque conditions (e.g., acceleration the rotation of the blades). When the rotor system 200 is under positive torque conditions, the drive link 202a accommodates outward stretch motions 279a (e.g., via its bearings) and the sensor arm 248a can laterally plunge (e.g., in an axial manner, as generally illustrated by arrow 280a) into the hollow portion 254a of the sensor link 243a.

FIG. 5B illustrates an example when the rotor hub is under negative torque conditions (e.g., deceleration of the rotation of the blades) in which the drive link 202a accommodates inward stretch motions 279b (e.g., via its bearings) and the sensor arm 248a can laterally pull out of (e.g., in an axial manner, as generally illustrated by arrow 280b) the hollow portion 254a of the sensor link 243a. Accordingly, as illustrated in FIGS. 4A-4B and 5A-5B, a sensor link for a drive link mounted sensor system (e.g., sensor link 243a in sensor system 241a), as discussed for various embodiments described herein, can accommodate rotational and/or lateral movements that may be experienced during flapping and/or during changes in torque for a rotor system (e.g., rotor system 200).

Figure 6:
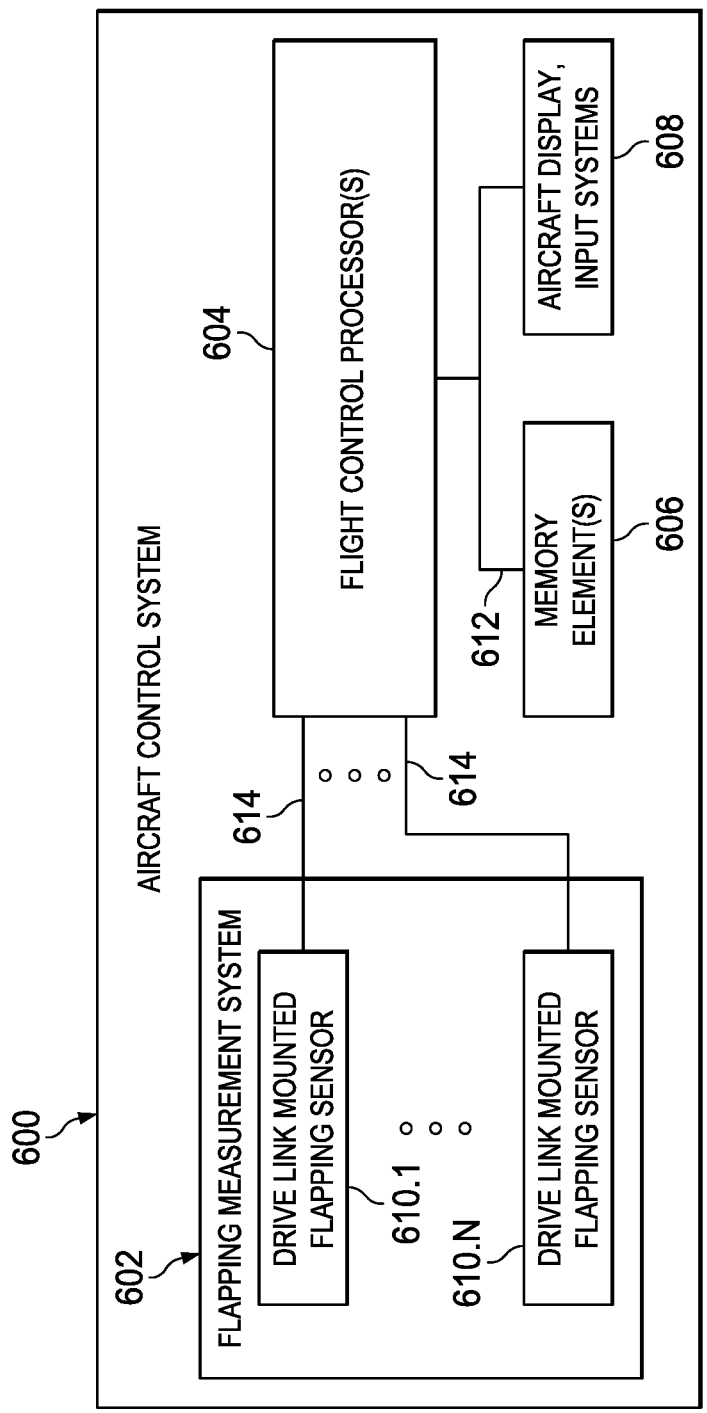
FIG. 6 is a simplified block diagram illustrating example details associated with a flapping measurement system, in accordance with certain embodiments.

Referring to FIG. 6, FIG. 6 is a simplified block diagram of an example aircraft control system 600 for an aircraft, in accordance with certain embodiments. The aircraft control system 600 can include a flapping measurement system 602, at least one flight control processor(s) 604, at least one at least one memory element(s) 606, and aircraft display and input systems 608. The flapping measurement system can include an 'N' number of drive link mounted flapping sensors 610.1-610.N. At least one flight control processor(s) 604 can be at least one hardware processor(s) that uses software, firmware, combinations thereof, or the like to execute operations. At least one memory element(s) 606 can store instructions that when executed cause the flight control processor(s) 604 to carry out operations. In various embodiments, aircraft display and input systems 608 can include displays that may provide user interfaces to allow a user, such as a pilot, to interact with the system 600. Such a user interface may include a display device such as a graphical display device (e.g., a plasma display panel (PDP), a liquid crystal display (LCD), a light emitting diode (LED) display, a cathode ray tube (CRT), etc.). In various embodiments, aircraft display and input systems 608 may also include any appropriate input mechanism such as a keyboard, a touch screen, a mouse, a trackball, voice recognition, touch pad, etc. In some embodiments, inputs for input systems can include pilot input generated using a manual control device, an electronic control device, or a combination thereof. In still some embodiments, inputs can be a remote signal received by the aircraft from a ground-based pilot/operator. Other inputs are also contemplated, including inputs from flight controllers, including a cyclic, a collective, and/or pedals. The aircraft control system 600 may be responsive to intended pilot inputs and/or other system inputs.

The system 600 may include one or more buses, such as a system bus and a memory bus, collectively represented in FIG. 6 by a bus 612, for enabling electronic communications between system components. The system 600 may also include one or more communication link(s) 614 for enabling communication between system components (e.g., between drive link mounted flapping sensors 610.1-610.N and flight control processor(s) 604, etc.). In various embodiments, communication link(s) 614 can include wired or wireless communication links (e.g., near field communication (NFC), Bluetooth™, etc.). A flight control processor 604, which may also be referred to as a central processing unit (CPU), can include any general or special-purpose processor capable of executing machine-readable instructions and performing operations on data as instructed by the machine-readable instructions. A memory element 606 may be directly accessible by the hardware processor for accessing machine-readable instructions and may be in the form of random access memory (RAM) or any type of dynamic storage (e.g., dynamic random-access memory (DRAM)).

System 600 may also include non-volatile memory, such as a hard disk, that is capable of storing electronic data including executable software files. In some embodiments, externally stored electronic data may be provided to system 600 through one or more removable media drives, which may be configured to receive any type of external media such as compact discs (CDs), digital video discs (DVDs), flash drives, external hard drives, etc.

As used herein, the term 'removable media drive' refers to a drive configured to receive any type of external computer-readable media. Instructions embodying activities, functions, operations, etc. described herein may be stored on one or more external and/or internal computer-readable media. Additionally, such instructions may also, or alternatively, reside at least partially within a memory element (e.g., in main memory or cache memory of processor(s) 604 during execution, or within a non-volatile memory element(s) (e.g., one or more memory element(s) 606) of system 600. Accordingly, other memory element(s) 606 of system 600 may also constitute computer-readable media. As referred to herein in this Specification, the term 'computer-readable medium' is meant to include any non-transitory computer-readable storage medium (e.g., embedded logic provided in an application specific integrated circuit (ASIC), in digital signal processing (DSP) instructions, software [potentially inclusive of object code and source code], etc.) that is capable of storing instructions for execution by system 600 (e.g., by one or more flight control processor(s) 604) that causes the system to perform any of one or more of the activities, functions, operations, etc. disclosed herein.

In various embodiments, the at least one flight control processor(s) 604 can execute instructions to perform operations to determine an amount of flapping and flapping direction of a rotor hub of a rotor system (e.g., rotor hub 213 of rotor system 200) and/or to control (e.g., manage and/or adjust) flapping direction and/or amount of flapping (e.g., based on the determine amount and direction of flapping and/or based on system inputs, etc.) for the rotor system.

Figure 7:
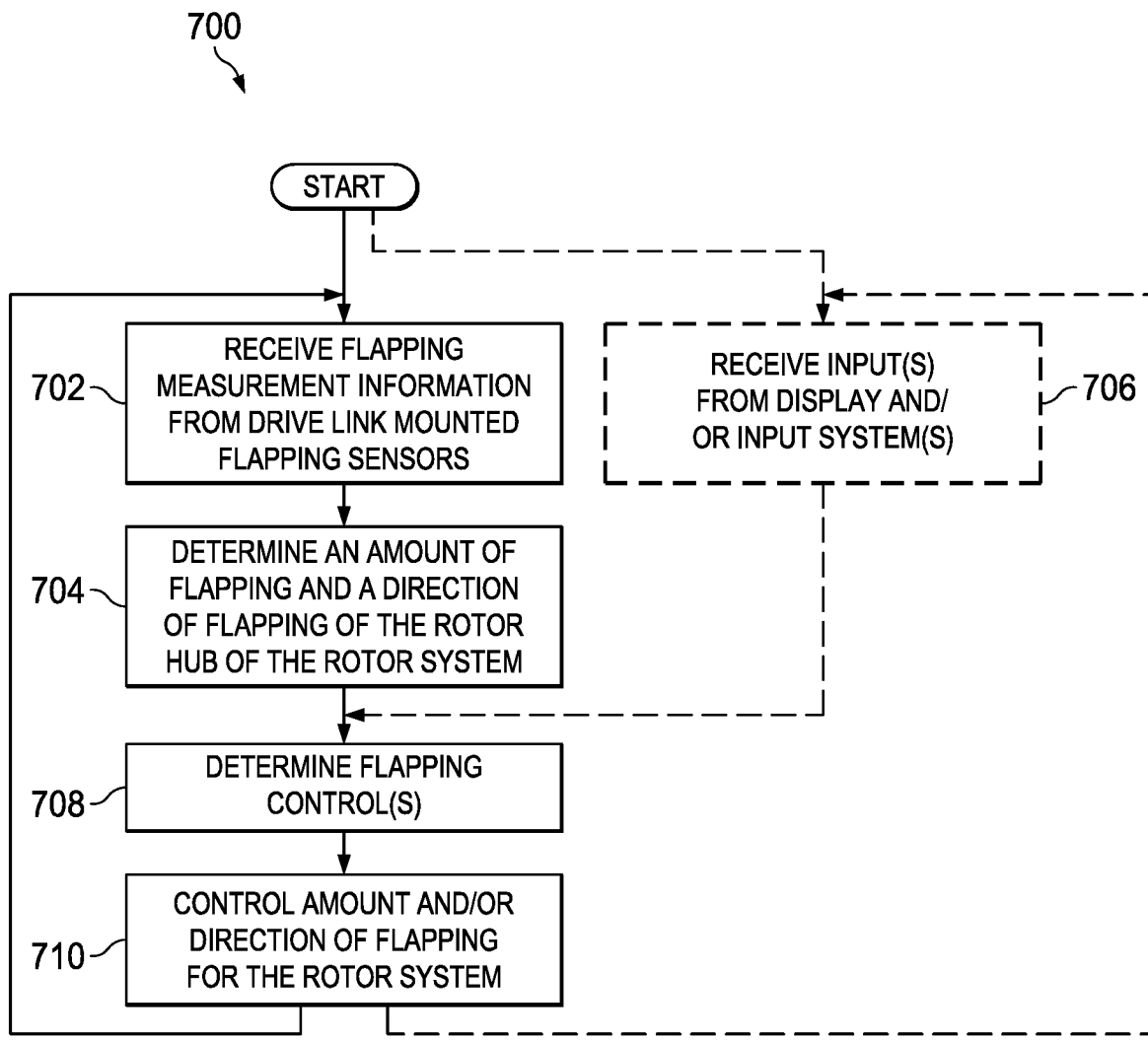
FIG. 7 is a simplified flowchart illustrating example details associated with processing flapping measurements, in accordance with certain embodiments.

Referring to FIG. 7, FIG. 7 is a simplified flowchart 700 illustrating example details associated with processing flapping measurement information received from drive link mounted flapping sensors, in accordance with certain embodiments. In at least one embodiment, the operations illustrated in FIG. 7 may be implemented by aircraft control system 600 illustrated in FIG. 6. In at least one embodiment, the flowchart may begin at 702 in which flapping measurement information (e.g., tracked motion measurement information) can be received from a plurality of drive link mounted flapping sensors of a flapping measurement system. The flapping measurement information may be associated with flapping experienced by the rotor hub of a rotor system. At 704, an amount of flapping and flapping direction of the rotor hub of the rotor system can be determined using the flapping measurement information. In some embodiments, input(s) from display(s) and/or input system(s) may additionally be received at 706. At 708, flapping control(s) for the rotor system can be determined based on the determined amount of flapping and flapping direction and additional input(s) received (if applicable). At 710, the amount of flapping and/or direction of flapping for the rotor system can be controlled (e.g., managed and/or adjusted). The flowchart 700 may be repeated for subsequent measurement information and/or input(s) received.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotor system comprising:
   a drive link associated with a rotor hub of the rotor system, the drive link comprising an inner member and an outer member; and
   a sensor system mounted to the drive link, the sensor system comprising:
      a sensor, the sensor comprising a sensor arm, wherein the sensor is mounted proximate to the inner member of the drive link; and
      a sensor link, the sensor link comprising a first end portion moveably coupled to the sensor arm, a second end portion coupled to the outer member of the drive link, and an angled portion between the first end portion and the second end portion to provide an angle for the sensor link.

2. The rotor system of claim 1, wherein the sensor is a rotary variable differential transformer.

3. The rotor system of claim 1, wherein the sensor is mounted to at least one of:
   the inner member of the drive link; and
   a trunnion extending within the inner member of the drive link.

4. The rotor system of claim 1, wherein the first end portion of the sensor link comprises a hollow portion to receive the sensor arm.

5. The rotor system of claim 4, wherein the first end portion of the sensor link accommodates lateral movements and rotational movements of the sensor arm within the hollow portion of the first end portion of the sensor link.

6. The rotor system of claim 5, wherein the second end portion of the sensor link accommodates rotational movements for the sensor link that is coupled to the outer member of the drive link.

7. The rotor system of claim 1, wherein the angled portion of the sensor link has a fixed angle.

8. The rotor system of claim 1, wherein the sensor system is one of a plurality of sensor systems of the rotor system.

9. A tiltrotor aircraft comprising:
   a fuselage; and
   a rotor system, the rotor system comprising:
      a drive link associated with a rotor hub of the rotor system, the drive link comprising an inner member and an outer member; and
      a sensor system mounted to the drive link, the sensor system comprising:
         a sensor, the sensor comprising a sensor arm, wherein the sensor is mounted proximate to the inner member of the drive link; and
         a sensor link, the sensor link comprising a first end portion moveably coupled to the sensor arm, a second end portion coupled to the outer member of the drive link, and an angled portion between the first end portion and the second end portion to provide an angle for the sensor link.

10. The tiltrotor aircraft of claim 9, wherein the sensor is a rotary variable differential transformer.

11. The tiltrotor aircraft of claim 9, wherein the sensor is mounted to at least one of:
    the inner member of the drive link; and
    a trunnion extending within the inner member of the drive link.

12. The tiltrotor aircraft of claim 9, wherein the first end portion of the sensor link accommodates lateral movements and rotational movements of the sensor arm within a hollow portion of the first end portion of the sensor link.

13. The tiltrotor aircraft of claim 9, wherein the second end portion of the sensor link accommodates rotational movements of the second end portion of the sensor link that is coupled to the outer member of the drive link.

14. The tiltrotor aircraft of claim 9, wherein the angled portion of the sensor link has a fixed angle.

15. The tiltrotor aircraft of claim 9, wherein the second end portion of the sensor link is coupled to the outer member of the drive link using a spherical bearing.

16. A sensor system comprising:
    a sensor, the sensor comprising a sensor arm, wherein the sensor is mounted proximate to an inner member of a torque transfer element; and
    a sensor link, the sensor link comprising a first end portion moveably coupled to the sensor arm, a second end portion coupled to an outer member of the torque transfer element, and an angled portion between the first end portion and the second end portion to provide an angle for the sensor link, wherein the sensor system is to measure flapping associated with a rotor hub.

17. The sensor system of claim 16, wherein the first end portion of the sensor link accommodates lateral movements and rotational movements of the sensor arm within a hollow portion of the first end portion of the sensor link.

18. The sensor system of claim 16, wherein the second end portion of the sensor link accommodates rotational movements of the second end portion of the sensor link that is coupled to the outer member of the torque transfer element.

* * * * *